(12) United States Patent
Wang et al.

(10) Patent No.: US 11,374,729 B2
(45) Date of Patent: Jun. 28, 2022

(54) AUDIO SYNCHRONIZATION PROCESSING CIRCUIT AND METHOD THEREOF

(71) Applicant: Nuvoton Technology Corporation, Hsinchu Science Park (TW)

(72) Inventors: Cheng-Chieh Wang, Hsinchu (TW); Ming-Ying Liu, Hsinchu (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 0 days.

(21) Appl. No.: 17/138,067

(22) Filed: Dec. 30, 2020

(65) Prior Publication Data

US 2021/0203472 A1    Jul. 1, 2021

(30) Foreign Application Priority Data

Dec. 30, 2019   (TW) .................................. 108148301

(51) Int. Cl.
*H04L 7/00* (2006.01)
*G06F 13/16* (2006.01)

(52) U.S. Cl.
CPC ........ *H04L 7/0016* (2013.01); *G06F 13/1689* (2013.01)

(58) Field of Classification Search
CPC ... H04L 7/0016; G06F 13/1689; G06F 13/42; G06F 13/4234; G06F 13/4295
See application file for complete search history.

(56) References Cited

U.S. PATENT DOCUMENTS

| 9,471,531 | B2* | 10/2016 | Jensen ................ G06F 13/4291 |
| 9,621,336 | B1  | 4/2017  | Peters, II et al. |
| 10,042,383 | B2* | 8/2018 | Lim .......................... G06F 1/08 |
| 2004/0039857 | A1* | 2/2004 | Takeda ................ G06F 13/1689 710/100 |
| 2004/0201939 | A1 | 10/2004 | Shipton et al. |
| 2018/0287771 | A1* | 10/2018 | Srivastava .............. G06F 13/40 |

FOREIGN PATENT DOCUMENTS

| CN | 105308932 A | 2/2016 |
| TW | 200731702 A | 8/2007 |
| TW | 201828709 A | 8/2018 |

\* cited by examiner

*Primary Examiner* — Betsy Deppe
(74) *Attorney, Agent, or Firm* — Muncy, Geissler, Olds & Lowe, P.C.

(57) ABSTRACT

An audio synchronization processing method is provided. The method includes the following steps: receiving an input request signal; in response to receiving the input request signal, starting performing a counting operation according to a basic clock signal; outputting an output request signal according to a sampling-clock signal; in response to outputting the output request signal, stopping performing the counting operation to obtain a counting value; determining whether synchronization has been achieved based on the counting value; and in response to determining that the synchronization has not been reached, adjusting a frequency of the sampling-clock signal according to the counting value.

11 Claims, 3 Drawing Sheets

AUDIO SYNCHRONIZATION PROCESSING CIRCUIT AND METHOD THEREOF

CROSS REFERENCE TO RELATED APPLICATIONS

This application claims priority of Taiwan Patent Application No. 108148301, filed on Dec. 30, 2019, the entirety of which is incorporated by reference herein.

BACKGROUND OF THE INVENTION

Field of the Invention

The present invention relates to audio synchronization technology, in particular to an audio synchronization processing circuit and method that can achieve synchronization with a host by adjusting a clock unit, thereby improving audio quality.

Description of the Related Art

With the rapid growth of the 3C industry, transmission interfaces which are used by devices to transmit data between each other are constantly evolving. At present, the universal serial bus (Universal Serial Bus, USB) technology is the most mature and popular. Therefore, the universal serial bus has become one of the main transmission interfaces in recent years.

There are four types of transmission for the specifications of the universal serial bus, including a control transfer type, an interrupt transfer type, a bulk transfer type, and an isochronous transfer type. For audio data that needs real-time and continuity assurances, the isochronous transmission type is usually used to transmit audio data, for example, from a host to a device.

However, during the process of the audio data transmission, some problems inducing poor audio quality, often occur due to the unsynchronization between the clock on the host terminal and the clock on the device terminal, such as noise, damage to audio data, and pauses in playback.

BRIEF SUMMARY OF THE INVENTION

An embodiment of the present invention discloses an audio synchronization processing method. The method comprises the following steps: receiving an input request signal; in response to receiving the input request signal, starting performing a counting operation according to a basic clock signal; outputting an output request signal according to a sampling-clock signal; in response to outputting the output request signal, stopping performing the counting operation to obtain a counting value; determining whether synchronization has been achieved based on the counting value; and in response to determining that the synchronization has not been reached, adjusting the frequency of the sampling-clock signal according to the counting value.

An embodiment of the present invention discloses an audio synchronization processing circuit. The audio synchronization processing circuit comprises a first transmission interface, a second transmission interface, and a processing module. The processing module receives an input request signal through the first transmission interface and starts performing a counting operation according to a basic clock signal in response to receiving the input request signal. The processing module outputs an output request signal through the second transmission interface according to a sampling-clock signal and stops performing the counting operation to obtain a counting value in response to outputting the output request signal. The processing module determines whether synchronization has been achieved based on the counting value. The processing module adjusts a frequency of the sampling-clock signal according to the counting value in response to determining that the synchronization has not been reached.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In order to make the above-mentioned objects, features and advantages of the embodiments of the present invention more obvious and understandable, a detailed description will be given below in conjunction with the accompanying drawings.

It must be understood that the words "comprises" and "include" used in this specification are used to indicate the existence of specific technical features, values, method steps, operations, elements, and/or components, however it is not excluded that more technical features, values, method steps, job processing, elements, components, or any combination of the above can be added.

The words, such as "first" and "second", are used to modify elements, not to indicate the order of priority or antecedent relationship between them, they are used only to distinguish elements with the same name.

Figure 1:
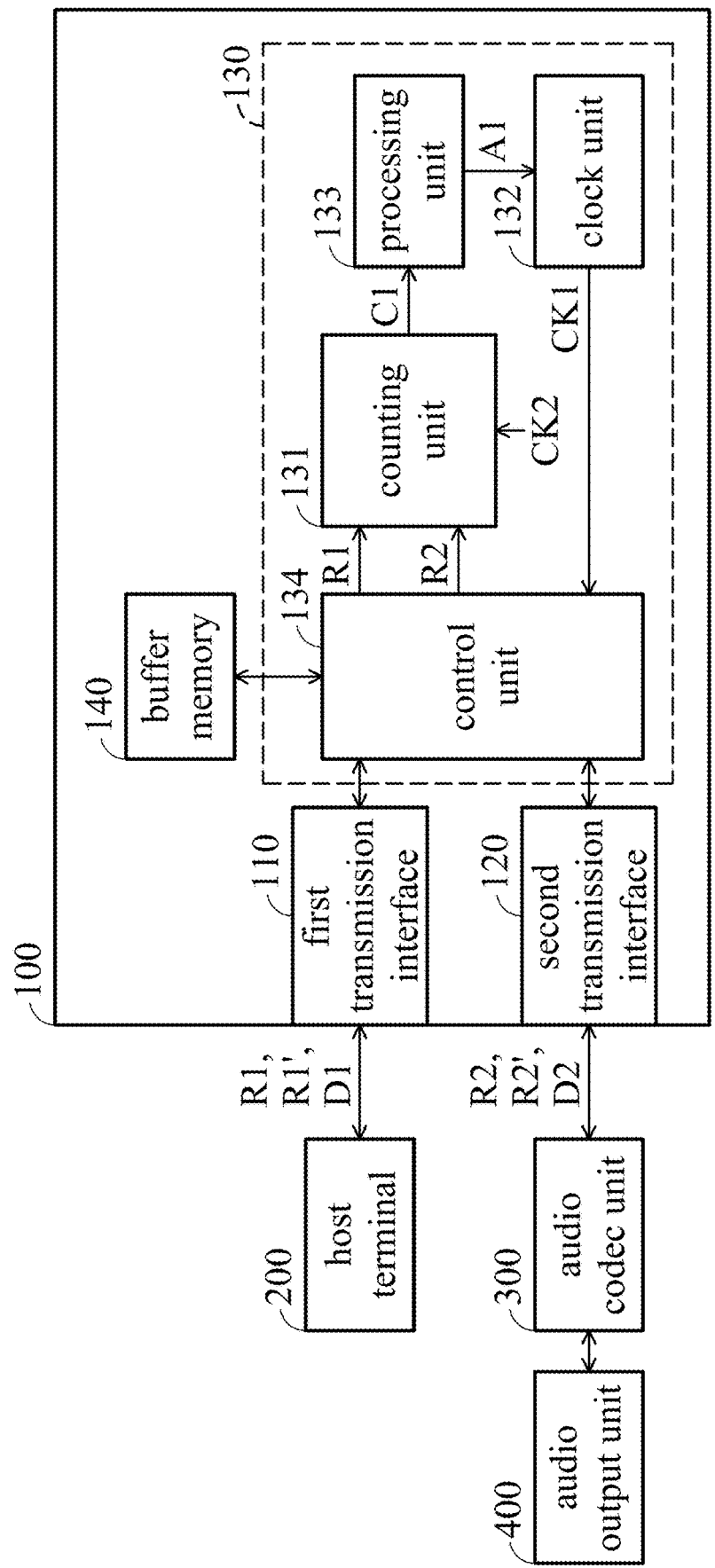
FIG. 1 is a block diagram of a system applying an audio synchronization processing circuit according to an embodiment of the present invention.

FIG. 1 is a block diagram of a system applying an audio synchronization processing circuit according to an embodiment of the present invention. Please refer to FIG. 1, an audio synchronization processing circuit 100 is coupled between a host terminal 200 and an audio codec unit 300. In some embodiments, the audio synchronization processing circuit 100 is connected to the host terminal 200 and the audio codec unit 300 through, but not limited to, a bus. In some aspects, the bus may be, for example, an Advanced High Performance Bus (AHB), however, the present invention is not limited thereto.

The host terminal 200 sequentially sends input audio data D1 to the audio synchronization processing circuit 100 according to a transmission frequency (for example, every fixed time of 1 millisecond, 125 microseconds, etc.), and the audio synchronization processing circuit 100 outputs the buffered audio data D2 to the audio codec unit 300 in sequence based on the frequency of the sampling-clock signal CK1. The audio codec unit 300 performs a specific process on the buffered audio data D2, and then an audio output unit 400 coupled to the audio codec unit 300 plays a corresponding audio signal according to the buffered audio data D2.

In some embodiments, the specific process of the audio codec unit 300 may be performed to convert the buffered audio data D2 from a digital electronic signal into an analog electronic signal, however the invention is not limited thereto. In some aspects, the audio output unit 400 may be, but not limited to, a speaker.

The audio synchronization processing circuit 100 may comprise at least two transmission interfaces (hereinafter referred to as a first transmission interface 110 and a second transmission interface 120) and a processing module 130. The processing module 130 is coupled to the first transmission interface 110 and the second transmission interface 120. In addition, the processing module 130 adjusts the frequency of the sampling-clock signal CK1 according to the audio synchronization processing method of any embodiment of the present invention, so that the output frequency of the audio synchronization processing circuit 100 (that is, the frequency of the sampling-clock signal CK1) is synchronized with the transmission frequency of the host terminal 200, so as to improve audio quality problems caused by non-synchronization, such as reducing the appearance of noise, damage, and pauses in playback.

It is worth noting that, in order to clearly illustrate the present invention, FIG. 1 is a simplified block diagram in which only elements related to the present invention are shown. Those skilled in the art should understand that the system may also comprise other components to provide specific functions.

Figure 2:
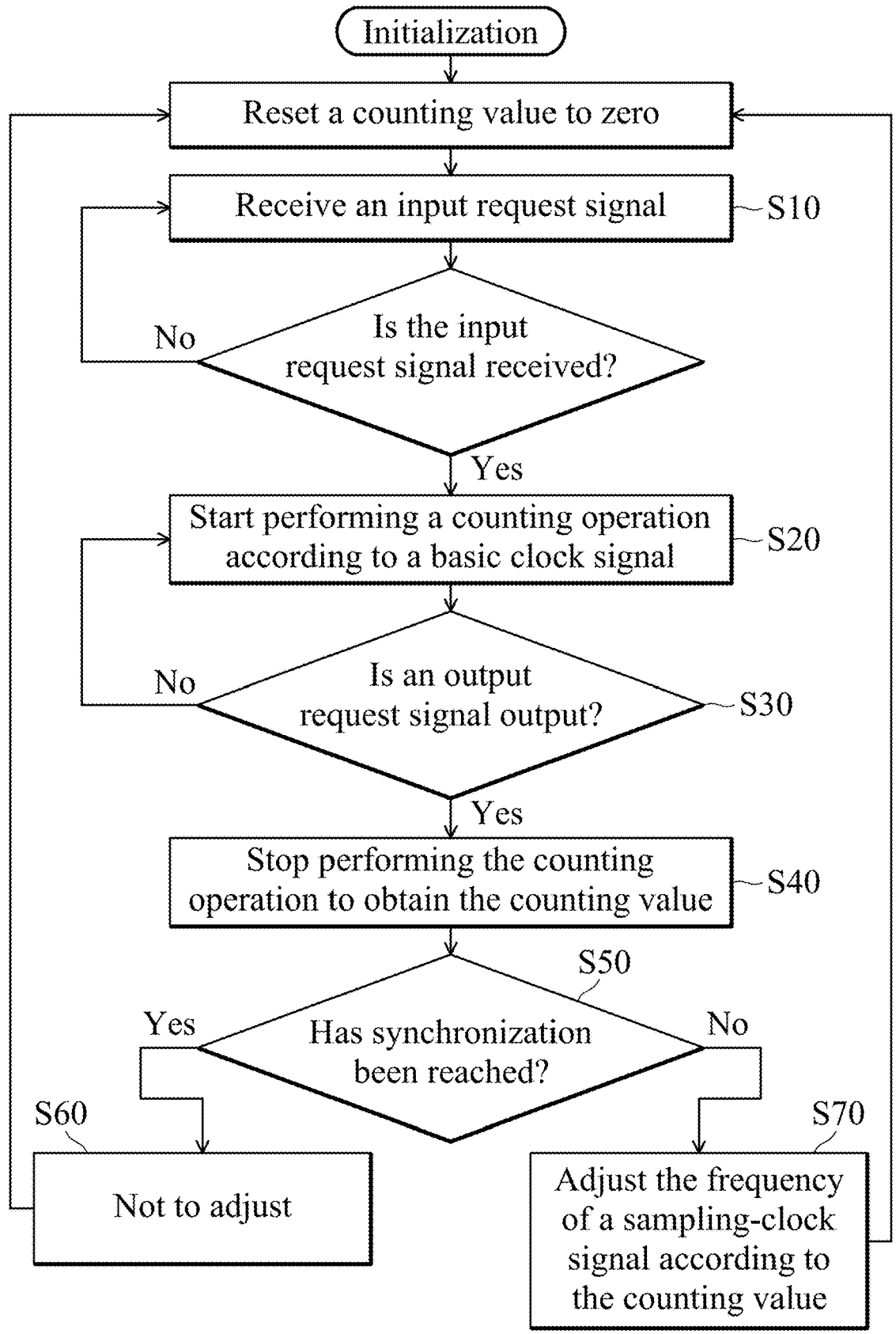
FIG. 2 is a schematic flowchart of an audio synchronization processing method according to an embodiment of the present invention.

FIG. 2 is a schematic flowchart of an audio synchronization processing method according to an embodiment of the present invention. Please refer to FIGS. 1 and 2. In an embodiment of an audio synchronization processing method, the processing module 130 of the audio synchronization processing circuit 100 receives an input request signal R1, which is transmitted by the host terminal 200 according to its transmission frequency, through the first transmission interface 110 (Step S10). When receiving the input request signal R1, the processing module 130 starts performing a counting operation according to the basic clock signal CK2 (Step S20). Subsequently, the processing module 130 outputs an output request signal R2 through the second transmission interface 120 according to the sampling-clock signal CK1 (Step S30). When the output request signal R2 is output, the processing module 130 stops performing the counting operation to obtain a counting value C1 between the time when the input request signal R1 is received and the time when the output request signal R2 (that is, a counting value C1 between the input request signal R1 and the output request signal R2) is output (Step S40). Then, the processing module 130 determines whether the transmission frequency of the host terminal 200 is synchronized with the frequency of the sampling-clock signal CK1 according to the obtained counting value C1 (that is, the processing module 130 determines whether the synchronization has been achieved) (Step S50).

When the processing module 130 determines that the synchronization is reached in Step S50, the processing module 130 does not adjust the frequency of the sampling-clock signal CK1 (Step S60). In addition, after Step S60, the processing module 130 may further return to Step S10 to restart the audio synchronization processing flow.

When the processing module 130 determines that the synchronization has not been reached in Step S50, the processing module 130 adjusts the frequency of the sampling-clock signal CK1 according to the counting value C1 (Step S70). In addition, after Step S70, the processing module 130 may further return to Step S10 to repeatedly perform the audio synchronization processing method, so that the frequency of the sampling-clock signal CK1 can gradually become synchronized with the transmission frequency of the host terminal 200, thereby improve audio quality.

In some embodiments, as shown in FIG. 1, the processing module 130 may comprise a counting unit 131, a clock unit 132, a processing unit 133, and a control unit 134. The counting unit 131 is coupled to the processing unit 133, and the processing unit 133 is coupled to the clock unit 132. The control unit 134 is coupled to the counting unit 131, the clock unit 132, the first transmission interface 110 and the second transmission interface 120.

The counting unit 131 is controlled by the control unit 134. In the embodiment, the counting unit 131 may be controlled by the control unit 134 to start performing the counting operation according to the basic clock signal CK2 and stop performing the counting operation to obtain the counting value C1. The counting unit 131 outputs the obtained counting value C1 to the processing unit 133.

The clock unit 132 is configured to generate the sampling-clock signal CK1 and controlled by the processing unit 133. In the embodiment, the clock unit 132 may adjust the frequency of the sampling-clock signal CK1 according to the control of the processing unit 133.

The processing unit 133 is configured to determine whether the synchronization is achieved according to the counting value C1 output by the counting unit 131. When determining that the synchronization has not been reached, the processing unit 133 outputs an adjustment signal A1 to the clock unit 132, so that the clock unit 132 correspondingly adjusts the frequency of the sampling-clock signal CK1 according to the adjustment signal A1.

The control unit 134 is configured to receive the input request signal R1 through the first transmission interface 110 and enable the counting unit 131 to start performing the counting operation when the input request signal R1 is received. In addition, the control unit 134 is further configured to output the output request signal R2 through the second transmission interface 120 according to the sampling-clock signal CK1 and causes the counting unit 131 to stop performing the counting operation when the output request signal R2 is output.

In some embodiments, the audio synchronization processing circuit 100 may further comprise a buffer memory 140. The buffer memory 140 is coupled to the control unit 134. In some embodiments, the buffer memory 140 can be implemented by, but not limited to, a random access memory (RAM). In addition, the buffer memory 140 may be a temporary storage area (buffer) in a random access memory.

In an embodiment of Step S10, after the control unit 134 of the processing module 130 receives the input request signal R1 through the first transmission interface 110, the control unit 134 may further transmit an input replay signal R1' back to the host terminal 200 through the first transmission interface 110 to notify the host terminal 200 that it can output the input audio data D1. In addition, after the control unit 134 receives the input audio data D1 transmitted by the host terminal 200 through the first transmission interface 110, the control unit 134 may store the input audio data D1 in the buffer memory 140 for buffering.

In some embodiments, the control unit 134 may comprise a first-in first-out (FIFO) memory (not shown). Therefore, the input audio data D1 can be stored in the buffer memory 140 after passing through the first-in first-out memory of the control unit 134.

In an embodiment of Step S20, when the control unit 134 receives the input request signal R1, it transmits the input request signal R1 to the counting terminal of the counting unit 131, so that the counting unit 131 starts performing the counting operation according to the basic clock signal input to the counting terminal of the counting unit 131.

In an embodiment of Step S30, the control unit 134 outputs the output request signal R2 to the audio codec unit 300 through the second transmission interface 120 according to the sampling-clock signal CK1 to request that the buffered audio data D2 is output to the codec unit 300. In addition, when the codec unit 300 receives the output request signal R2, it transmits an output reply signal R2' back to the control unit 134 to notify the control unit 134 that the buffered audio data D2 can be output. In some embodiments, after the control unit 134 outputs the output request signal R2 and receives the output reply signal R2', the control unit 134 may retrieve the buffered audio data D2 from the buffer memory 140 and output it to the codec unit 300 through the second transmission interface 120. The buffered audio data D2 is the input audio data D1 which is previously output by the host terminal 200 and stored in the buffer memory 140. The input audio data D1 just stored in the buffer memory 140 will be first retrieved by the control unit 134 as the buffered audio data D2. However, the present invention is not limited thereto. In some embodiments, each time the control unit 134 retrieves audio data from the buffer memory 140, the control unit 134 takes the longest stored input audio data D1 as the buffered audio data D2 and retrieves it (that is, the control unit 134 retrieved audio data from the buffer memory 140 based on the input sequence of the pieces of input audio data D1).

In some embodiments, the buffered audio data D2 may pass through the first-in first-out memory of the control unit 134 and then output to the codec unit 300.

Figure 3:
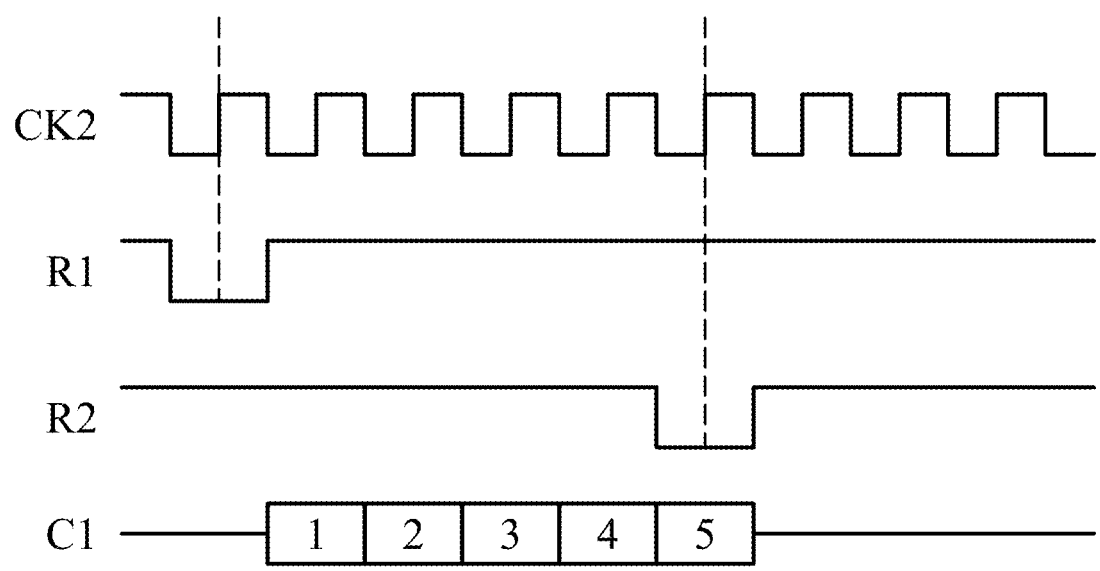
FIG. 3 is a schematic diagram showing waveforms of signals related to a counting unit according to an embodiment of the present invention.

In an embodiment of Step S40, when the control unit 134 outputs the output request signal R2 through the second transmission interface 120, the control unit 134 also outputs the output request signal R2 to the stop terminal of the counting unit 131, so that the counting unit 131 stops performing the counting operation. The processing unit 133 thus obtains the current counting value C1 counting by the counting unit 131. As shown in the example of the waveform diagram of FIG. 3, the counting value C1 counted by the counting unit 131 between the input request signal R1 and the output request signal R2 is output is 5.

In an embodiment of Step S50, when the counting value C1 is not zero, the processing unit 133 determines that the synchronization has not been reached and continues to perform Step S70.

In an embodiment of Step S70, the processing unit 133 compares the counting value C1 with a plurality of preset intervals to determine which preset interval the counting value C1 falls into. The processing unit 133 generates a corresponding adjustment signal A1 according to the preset interval into which the counting value C1 falls and transmits it to the clock unit 132, so that the clock unit 132 can adjust the frequency of the sampling-clock signal CK1 according to the adjustment signal A1.

For example, assume that there are three preset intervals. The first preset interval is defined by a first value, and the counting value C1 is less than the first value; the second preset interval is defined by the first value and a second value, and the counting value C1 is greater than the first value but less than the second value; the third preset interval is defined by the second value, and the counting value C1 is greater than the second value. When the processing unit 133 determines that the counting value C1 falls into the first preset interval, the adjustment signal A1 generated by the processing unit 133 causes the clock unit 132 to increase the frequency of the sampling-clock signal CK1 by a first percentage, that is, the increased frequency of the sampling-clock signal CK1 is equal to the basic frequency of the sampling-clock signal CK1 plus the product of the basic frequency and the first percentage. When the processing unit 133 determines that the counting value C1 falls into the second preset interval, the adjustment signal A1 generated by the processing unit 133 causes the clock unit 132 to increase the frequency of the sampling-clock signal CK1 by a second percentage, that is, the increased frequency of the sampling-clock signal CK1 is equal to the basic frequency of the sampling-clock signal CK1 plus the product of the basic frequency and the second percentage. Moreover, when the processing unit 133 determines that the counting value C1 falls into the third preset interval, the adjustment signal A1 generated by the processing unit 133 causes the clock unit 132 to adjust the frequency of the sampling-clock signal CK1 by a third percentage, that the increased frequency of the sampling-clock signal CK1 is equal to the basic frequency of the sampling-clock signal CK1 plus the product value of the basic frequency and the third percentage. In the embodiment, the third percentage is greater than the second percentage, and the second percentage is greater than the first percentage.

In some embodiments, the first value may be, but not limited to, 5, and the second value may, be but not limited to, 10. The basic frequency of the sampling-clock signal CK1 may be, but not limited to, 20 kHz. The first percentage may be, but not limited to, 1%. The second percentage may be, but not limited to, 2%. In addition, the third percentage may be, but not limited to, 3%.

In some embodiments, the basic frequency of the sampling-clock signal CK1, the plurality of preset intervals, and the adjustment signal corresponding to each preset interval can be set according to the system requirements. For example, these signals and present intervals may be written in a configuration file, so that the audio synchronization processing circuit 100 can perform related settings according to the configuration file during initialization.

In some embodiments, the counting unit 131 is reset to zero each time before starting performing the counting operation, that is, the previous counting value obtained is cleared. In some aspects, the counting unit 131 may be implemented by a synchronous counter, an asynchronous counter, and the like. In addition, the counting unit 131 can be implemented by digital circuit synthesis through a hardware description language, however the invention is not limited thereto.

In some aspects, each of the first transmission interface 110 and the second transmission interface 120 may be implemented by a universal serial bus (Universal Serial Bus, USB), a serial peripheral interface (Serial Peripheral Interface, SPI), a universal asynchronous Transceiver (Universal Asynchronous Receiver/Transmitter, UART) transmission interface, a wireless network transmission interface, Integrated Interchip Sound (I2S) transmission interface, a pulse code modulation (PCM) transmission interface, a pulse density modulation (PDM) transmission interface and so on. In addition, the transmission standard adopted by the first transmission interface 110 may be the same as or different from the transmission standard adopted by the second transmission interface 120.

In some embodiments, the audio synchronization processing circuit 100 may be an internal circuit included in a direct memory access (DMA) controller. The control unit 134 may be a peripheral interface controller in the direct memory access controller, and the input request signal R1 and output request signal R2 are direct memory access request (DMA request) signals, however the present invention is not limited thereto.

In particular, in this case, when the adjustment function of the frequency of the sampling-clock signal CK1 is directly added to the direct memory access controller, the required cost can be reduced. In addition, using direct memory access request signals (that is, the input request signal R1 and the output request signal R2) to determine the timing can also minimize the adjustment error.

In summary, the embodiments of the present invention provide an audio synchronization processing circuit and method thereof, which determine whether synchronization is achieved due to the counting value obtained between the input request signal and the output request signal adjust the frequency of the sampling-clock signal according to the counting value when the synchronization has not been reached, so that the host terminal and the device terminal can be synchronized, thereby improving the problem of poor audio quality. In addition, an embodiment of the audio synchronization processing circuit and method of the present invention may be realized by adding a function of adjusting the frequency of the sampling-clock signal based on a direct memory access controller, which can reduce the cost. Furthermore, an embodiment of the audio synchronization processing circuit and method of the present invention uses a direct memory access request signal to determine the timing, which can minimize the adjustment error.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio synchronization processing method, comprising:
   receiving an input request signal;
   in response to receiving the input request signal, starting performing a counting operation according to a basic clock signal;
   outputting an output request signal according to a sampling-clock signal;
   in response to outputting the output request signal, stopping performing the counting operation to obtain a counting value;
   determining whether synchronization has been achieved based on the counting value; and
   in response to determining that the synchronization has not been reached, adjusting a frequency of the sampling-clock signal according to the counting value.

2. The audio synchronization processing method as claimed in claim 1, wherein after receiving the input request signal, the audio synchronization processing method further comprises:
   receiving input audio data; and
   storing the input audio data in a buffer memory.

3. The audio synchronization processing method as claimed in claim 2, wherein after outputting the output request signal, the audio synchronization processing method further comprises:
   retrieving buffered audio data from the buffer memory; and
   outputting the buffered audio data.

4. The audio synchronization processing method as claimed in claim 1 wherein adjusting the frequency of the sampling-clock signal according to the counting value comprises:
   determining which one of a plurality of preset intervals the counting value falls into; and
   adjusting the frequency of the sampling-clock signal according to the preset interval into which the counting value falls.

5. The audio synchronization processing method as claimed in claim 1, further comprising:
   in response to determining that that the synchronization has been achieved, not adjusting the frequency of the sampling-clock signal.

6. An audio synchronization processing circuit, comprising:
   a first transmission interface;
   a second transmission interface; and
   a processor coupled to the first transmission interface and the second transmission interface and configured to receive an input request signal through the first transmission interface and to start performing a counting operation according to a basic clock signal in response to receiving the input request signal,
   wherein the processor is configured to output an output request signal through the second transmission interface according to a sampling-clock signal and to stop performing the counting operation to obtain a counting value in response to outputting the output request signal,
   wherein the processor is configured to determine whether synchronization has been achieved based on the counting value, and
   wherein the processor is configured to adjust a frequency of the sampling-clock signal according to the counting value in response to determining that the synchronization has not been reached.

7. The audio synchronization processing circuit as claimed in claim 6, wherein the processor comprises:
   a counter configured to generate the counting value, wherein the processor is configured to generate the sampling-clock signal and determine whether synchronization has been achieved according to the counting value, and wherein in response to determining that synchronization has not been achieved, the processor adjusts the frequency of the sampling-clock signal according to the counting value; and
   a controller coupled to the counter and configured to receive the input request signal and cause the counter to start performing the counting operation in response to receiving the input request signal,
   wherein the controller is further configured to output an output request signal according to the sampling-clock signal and causes the counter to stop performing the counting operation to obtain the counting value in response to outputting the output request signal.

8. The audio synchronization processing circuit as claimed in claim 7, wherein the processor determines which one of a plurality of preset intervals the counting value falls into and adjusts the frequency of the sampling-clock signal according to the preset interval into which the counting value falls.

9. The audio synchronization processing circuit as claimed in claim 6, further comprising:
   a buffer memory,
   wherein after receiving the input request signal, the processor further receives input audio data through the first transmission interface, and
   wherein the processor stores the input audio data in the buffer memory.

10. The audio synchronization processing circuit as claimed in claim 9, wherein after outputting the output request signal, the processor further retrieves buffered audio data from the buffer memory and outputs the buffered audio data through the second transmission interface.

11. The audio synchronization processing circuit as claimed in claim 6, wherein in response to determining that the synchronization has been achieved, the processor does not adjust the frequency of the sampling-clock signal.

\* \* \* \* \*